Sept. 20, 1949.   W. F. TICE   2,482,134
FRICTION FLYWHEEL DAMPENER FOR SERVOS
Filed July 28, 1945
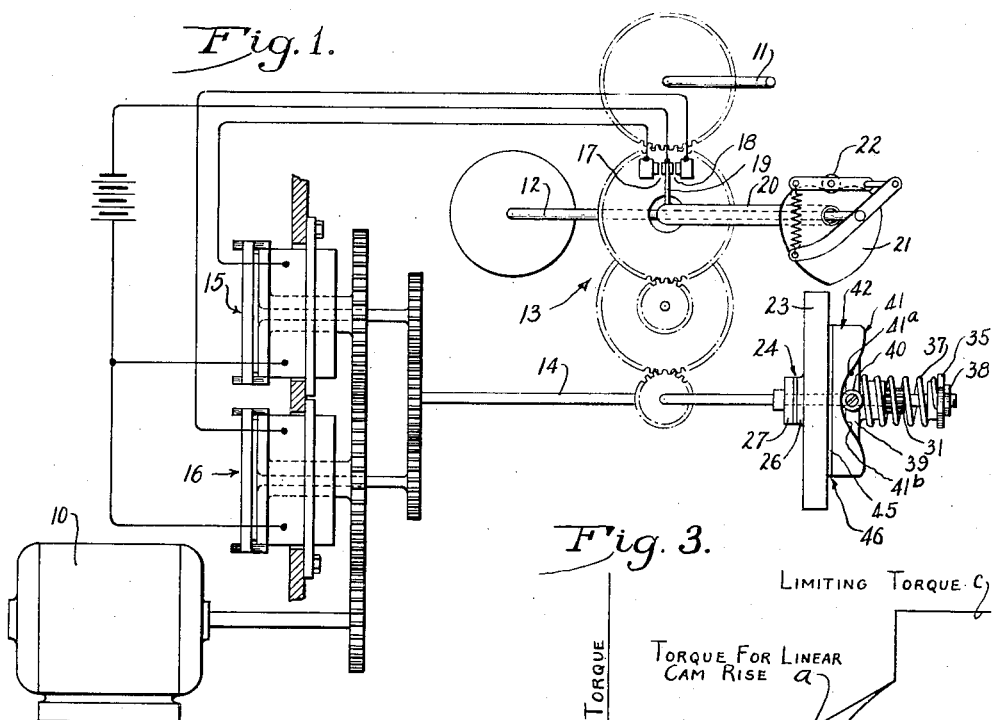
INVENTOR.
William F. Tice
BY
ATTORNEYS Patented Sept. 20, 1949

2,482,134

UNITED STATES PATENT OFFICE 2,482,134

FRICTION FLYWHEEL DAMPENER FOR SERVOS

William F. Tice, Rockford, Ill., assignor to Barber-Coleman Company, Rockford, Ill., a corporation of Illinois Application July 28, 1945, Serial No. 607,527

5 Claims. (Cl. 74—574)

This invention relates to power driven servos, the operation of which is stabilized and hunting prevented through the use of a flywheel driven from a high speed element of the servo by a slip coupling.

The primary object is to improve the stabilizing action of such a flywheel by varying the torque transmitting capacity of the coupling automatically in accordance with the acceleration of the rotary servo element.

A more detailed object is to couple the flywheel to the servo by a friction clutch whose members are constantly urged together by a force which changes automatically with the slippage of the clutch so as to increase the friction torque as the acceleration of the servo element increases.

Another object is to change the frictional effect by cam means which may be shaped to produce any desired characteristic.

A further object is to drive the flywheel through two friction clutches having different slipping characteristics.

Other objects and advantages of the invention will become apparent from the following detailed description taken in connection with the accompanying drawings, in which Figure 1 is a schematic view and wiring diagram of a servo actuator equipped with a friction coupled flywheel embodying the present invention.

Fig. 2 is a perspective view of the flywheel broken away on radial section lines.

Fig. 3 is a graph showing the flywheel characteristics.

The invention is shown in the drawings embodied in an electric servo actuator for transmitting power derived from an electric motor 10 to a load shaft 11 so as to cause the latter to follow closely the motions of a control shaft 12. The shaft 11 is driven through speed reduction gearing 13 from a shaft 14 which is rotated by the motor in one direction or the other depending on which of two electromagnetic friction clutches 15 and 16 is energized. The windings of these clutches are controlled by switches 17 and 18 having spaced contacts carried by a gear of the train 13 rotating in unison with the load shaft. The intermediate or common contact of the switches is on a tongue 19 fast on a sleeve 20 which carries a heart-shaped cam 21 whose follower 22 is mounted on the control shaft 12 and spring urged against the cam.

In the servo thus described, positional disagreement between the control and load shafts results in closure of one of the switches 17, 18 and energization of the proper clutch to drive the load shaft in the direction of the control shaft until the depression in the cam 21 is again presented to the follower 22 thereby opening both switches. As a result, the load shaft is power actuated to follow the movements of the control shaft.

A high speed element of the servo such as the shaft 14 is subjected to the effect of a flywheel 23 connected to the shaft through a slip coupling which resists relative rotation between the flywheel and shaft with a torque that remains substantially constant until slippage occurs and then increases progressively in accordance with the amount of slippage. In the form shown, this torque is derived frictionally by a clutch 24 comprising a flat ring 25 of friction material axially engaging the end of a hub 26 on the flywheel and a flange 27 on a sleeve 28 carried by the servo shaft 14 and keyed to the latter at 29. The flywheel is supported by the sleeve by ball bearings 30 and therefore is free to turn relative to the shaft 14 by slipping of the clutch 24.

Mounted on the sleeve 28 beyond the flywheel is a second sleeve 31 keyed at 32 to the first sleeve and having an inturned flange 33 clamped to the end of the sleeve 28 by a nut 34 which is threaded onto the end of the shaft 14. Beyond the end of the sleeve 31, the nut 34 is externally threaded and carries a nut 35 forming an adjustable abutment 36 for one end of a compression spring 37, the nut being held by a lock nut 38. The spring encircles the sleeve 31 and bears at its other end against a triangular member 39 whose hub is splined on the sleeve so as to be slidable along the latter. Rollers 40 carried by pins projecting from the corners of the triangle engage an axially facing surface 41 on the end of a cylindrical cam 42. The other shouldered end of the cam is pressed onto a flat ring 43 journaled on a hub 44 of the flywheel. A ring 45 of friction material is disposed between the ring 43 and an end face of the flywheel so as to form a second friction clutch 46. Through the cam 41 and the follower 39, the friction faces of both clutches are thus urged together under the same axial force produced by the spring 37, but, owing to the larger diameter of the clutch 46, slippage of the flywheel relative to the shaft 14 first occurs at the clutch 24. During such slippage, the follower member 39 turns with the shaft 14 and relative to the cam 41 which, up to the point of slippage of the clutch 46, turns with the flywheel.

In accordance with the present invention, slippage of the clutch 24 in response to a predetermined acceleration or deceleration of the shaft 14 is utilized to increase the torque capable of being transmitted by the clutch. To this end, the cam surface 41 opposite each of the rollers 40 is formed with inclines 41$^a$ and 41$^b$ converging toward each other and shaped according to the characteristics desired to be imparted to the friction coupling. When the rollers are disposed at the bottoms of the cam notches as shown, the clutches are engaged with a minimum spring force predetermined by the adjustment of the nut 35. As the shaft 14 and the follower member 39 keyed thereto turn in either direction, the rollers ride up one of the inclines shifting the follower axially along the splined sleeve 31 and correspondingly increasing the compression of the spring 37 and therefore the torque which the clutch 24 will transmit before slipping further. This torque is determined also by the component of the spring force acting tangentially of follower and cam inclines. This component is determined by the slope of the cams which may be large enough to enable the spring force to return the follower rollers to the low points of the cams whenever the acceleration torque being transmitted falls below a predetermined value. Such self-centering action is not, however, necessary or even desirable in order to obtain effective stabilization in most servo applications.

Means is provided for limiting the extent of relative motion between the cam and followers. Herein, this means comprises a pin 48 rigid with the cam 42 in a position to engage one edge of the follower plate 39 after the rollers 40 have turned somewhat less than sixty degrees in either direction away from the low points of the cam. With the cam and the member 39 of the friction clutch 46 thus locked to the servo shaft 14, further slippage between the flywheel and the shaft 14 is permitted only by slipping of the clutch 46 which, owing to its greater diameter, transmits a substantially increased torque and therefore responds only to relative wide accelerations.

Fig. 3 shows the torque curves of the friction coupling above described when the cam rises 41$^a$ and 41$^b$ are linear (curve $a$) and sinusoidal (curve $b$). The flywheel and the servo shaft rotate in unison until they are subject to acceleration or deceleration sufficient to overcome the low torque transmitted by the clutch 24 when the followers 40 are disposed at the low points of the cam and the spring force is at a minimum. Under greater accelerations, the extent of slippage will be correspondingly greater and against increasing frictional resistance because of the rise of the followers along the one or the other of the inclines 41$^a$ or 41$^b$ depending on whether the speed increases or decreases. As a result of such an increase in the coupling torque, the flywheel will be brought to the speed of the servo shaft sooner, thereby producing more effective stabilization. The range of effectiveness of the flywheel as a stabilizer is thus extended over a wider range of accelerations, the adjustment to suit the prevailing conditions being entirely automatic. Since the initial friction may be relatvely low, the torque due to static friction may be minimized and the flywheel adapted to slip at relatively low accelerations and with less variation of the slipping point. If the acceleration is so sudden and of sufficient magnitude to cause the cam plate 39 to engage the stop 48, the torque transmitting capacity of the coupling will rise sharply to the value $c$ (Fig. 3) thereby adapting the flywheel to stabilize the servo effectually under such an abnormal condition.

I claim as my invention:

1. The combination of a power driven rotary element, a flywheel mounted to turn about the axis of said element, two friction clutches of different diameters coupling said element and flywheel together and disposed with their axes coinciding with said flywheel axis, relatively rotatable cam and follower members adapted to shift axially relative to each other upon relative turning in either direction away from and back toward a predetermined angular position, one of said members being rotatable with said rotary element and the other with said flywheel through said larger clutch, a compression spring encircling said flywheel axis, means for transmitting the force of said spring directly to the smaller of said clutches and to the larger clutch through said cam and follower whereby the force of the spring is increased in response to slipping of the smaller clutch, and means positively limiting the extent of relative turning of the cam and follower in either direction.

2. The combination of a power driven rotary element, a flywheel mounted to turn about the axis of said element, two friction clutches of different diameters coupling said element and flywheel together and disposed with their axes coinciding with said flywheel axis, relatively rotatable cam and follower members adapted to shift axially relative to each other upon relative turning in either direction away from and back toward a predetermined angular position, one of said members being rotatable with said rotary element and the other with said flywheel through said larger clutch, and spring means acting directly to urge the members of said smaller clutch into gripping engagement and through said cam and follower to engage the second clutch whereby to increase the spring force automatically in response to axial separation of said cam follower during slippage of the smaller clutch.

3. The combination of a power driven rotary element, a flywheel mounted to turn about the axis of said element, two friction clutches of different diameters coupling said element and flywheel, spring means extensible and contractible along said axes and urging the elements of both of said clutches together with equal force, and means actuated through the medium of said larger clutch during slippage of the smaller clutch to increase the axial force exerted by said spring means.

4. In a servo actuator having a power driven rotary member, the combination of a flywheel mounted to turn about the axis of said member, a spring engaged friction clutch coupling said member and said flywheel and normally adapted to slip under a predetermined torque, a second spring engaged friction clutch coupling said member and said flywheel and adapted to slip under a torque of substantially higher value than said first mentioned torque, means operable to increase the value of said first mentioned torque progressively during slippage of said first mentioned coupling, and a stop limiting the amount of slipping of the elements of said first clutch coupling whereby to cause slippage of said second coupling as the torque to be transmitted increases to said higher value.

5. In a servo actuator having a power driven rotary member, the combination of a flywheel mounted to turn about the axis of said member, a spring engaged friction clutch coupling said member and said flywheel and normally adapted to slip under a predetermined torque, a second spring engaged friction clutch coupling said member and said flywheel and adapted to slip under a torque of substantially higher value than said first mentioned torque, and means operable after a predetermined angular slipping of the elements of said first clutch coupling to prevent further slipping of the latter coupling and cause slippage of said second coupling as the torque to be transmitted increases to said higher value.

WILLIAM F. TICE.

REFERENCES CITED

The following references are of record in the file of this patent:

UNITED STATES PATENTS

| Number | Name | Date |
|---|---|---|
| 1,913,984 | Hann | June 13, 1933 |
| 2,041,556 | Lee | May 19, 1936 |
| 2,119,413 | Batchelder | May 31, 1938 |